March 29, 1938. F. DILTS 2,112,483
TIRE INFLATION AND DEFLATION DETECTOR
Filed March 24, 1936 2 Sheets-Sheet 1
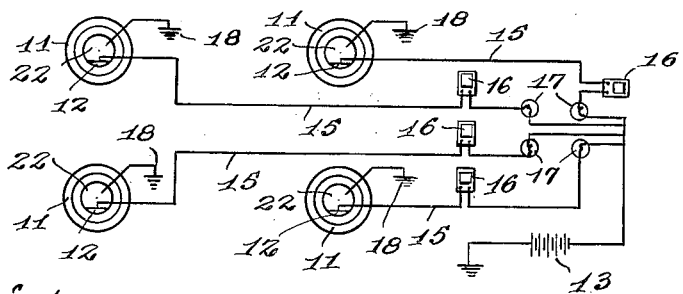
Fig. 1.
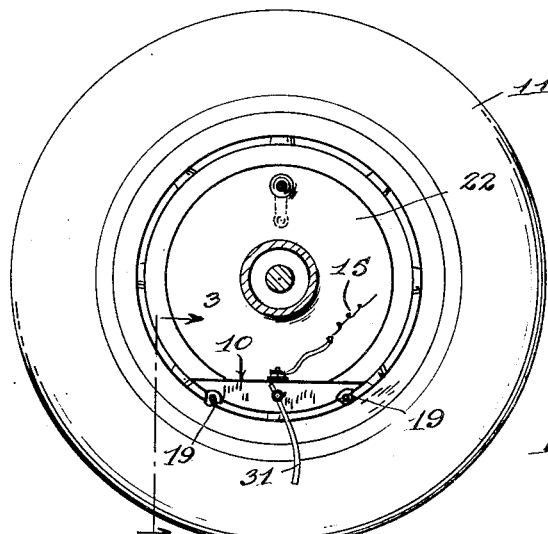
Fig. 2.
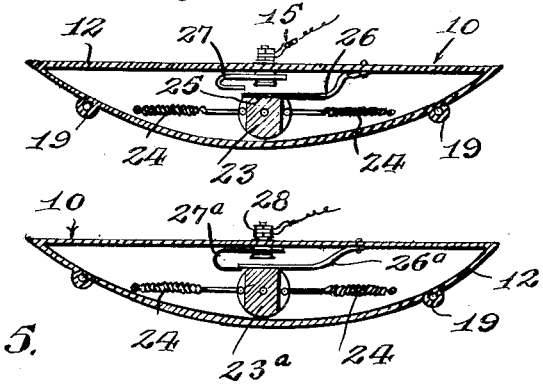
Fig. 4.
Fig. 5.
Inventor
Fred Dilts,
By Christian K. Nielsen
Attorney March 29, 1938.　　　　F. DILTS　　　　2,112,483
TIRE INFLATION AND DEFLATION DETECTOR
Filed March 24, 1936　　　　2 Sheets-Sheet 2

Fred Dilts, Inventor

By Christian R. Nielsen,
Attorney

Patented Mar. 29, 1938

2,112,483

UNITED STATES PATENT OFFICE 2,112,483

TIRE INFLATION AND DEFLATION DETECTOR

Fred Dilts, Lyons, Kans.

Application March 24, 1936, Serial No. 70,694

1 Claim. (Cl. 200—58)

My invention relates to a device which may be readily installed upon a motor vehicle to indicate by visual or audible signals the condition of the tires, and it consists in the constructions, arrangements and combinations herein described and claimed.

It is a primary purpose of the invention to provide a novel and simple construction of circuit maker or breaker, with novel means of attaching the same to a vehicle brake drum.

It is a further important object to provide a novel construction of cam and actuating means therefor.

Additional objects, advantages and features of invention will be apparent from the following description, considered in conjunction with the accompanying drawings, wherein Figure 1 is a plan view of a circuit as associated with a four wheeled vehicle and illustrating the audible and visual signals.

Figure 2 is a plan view of one of the vehicle wheels having my device installed thereon.

Figure 4 is a longitudinal sectional view illustrating my device constructed as a circuit maker.

Figure 5 is a similar view when constructed as a circuit breaker.

Figure 3:
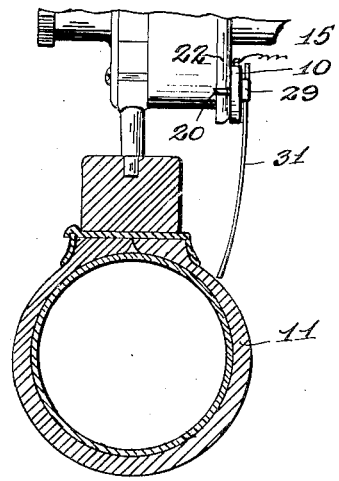
Figure 3 is an enlarged cross section on the line 3—3 of Figure 2.
Figures 6, 7:
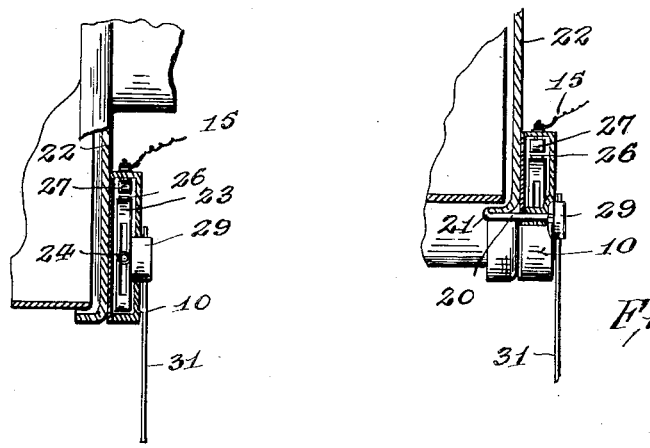
Figure 6 is a vertical sectional view of a portion of the brake drum illustrating the association between the parts.
Figure 7 is a similar view illustrating the mounting of the device to the brake housing.

It is a well known fact that many automobile accidents would be avoided, if the drivers were constantly kept informed of the state of inflation or deflation of the tires of the vehicle which they are driving; and such constant reminder would also tend to increase the life of the tires considerably, and in order to provide a device fulfilling the above and other requirements, I make use of a casing 10 adapted to be mounted to respective vehicle wheels, and containing a circuit make or breaker for actuating a buzzer and light as will be presently described in detail.

Attention is first invited to Figure 1 of the drawings wherein the tires of the wheels are indicated by the reference character 11, and associated with each tire 11 there is a respective circuit breaker or maker 12. From a battery 13 which is suitably grounded to the frame of the car, a lead 14 is extended and to which leads 15 are suitably connected, and in each lead 15 there are interposed a buzzer 16 and a light 17. Ordinarily the circuit maker or breaker will be mounted in contacting relation with the brake plate of the wheels and in order to complete the circuit, this plate will be grounded as at 18.

From the foregoing, it will be apparent that whenever any of the circuit breakers 12 are actuated, due to faulty inflation, the buzzer 16 and light 17 associated with that particular circuit will be energized to warn the driver of a dangerous tire condition. Preferably, the buzzers and lights are arranged upon the instrument board in the line of vision of the driver.

The circuit maker shown in Figure 4 will now be described in detail. The casing 10 is of semi-circular shape, adapted to fit within the circumference of the rim of the wheel and includes a pair of spaced lugs 19 receiving therethrough mounting bolts 20, the inner end of which are hooked as at 21 for engagement with the brake plate 22. The casing 10 may thus be drawn into snug contacting relation with the plate in order to complete the circuit with ground 18, as well as to securely hold the casing against undue rattle.

Figure 8:
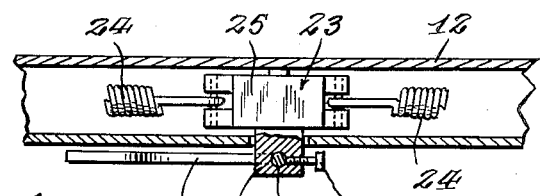
Figure 8 is a detail of the mounting of the actuator rod.

Within the casing 10 there is oscillatably mounted a cam 23, suspended by means of oppositely disposed and anchored springs 24. The cam 23 includes a flat face 25 against which a lead spring 26 normally rests, and in the path of the free end of this spring there is a rigid contact spring 27, mounted to the casing by a bolt 28, which also serves as a binding post for the lead 15. As may be seen from Figure 8, the cam 23 has a hub portion 29, which may be integral therewith, or otherwise, and extending vertically therethrough there is a bore 30. An actuator rod 31 is inserted through the bore and held therein by a set screw 32 which will impinge upon the rod for retention thereof. The lower free end of the rod 31 stops closely adjacent the outer surface of the tire 11 so as to be contacted thereby, at times, as will be explained in the operation of the device.

The operation

The operation will be readily understood from the following description:

So long as the tires of the vehicle contain the required degree of inflation, the actuator rod 31 will be retained in its neutral position, that is, out of engagement with the tire, but as soon as any of the tires become deflated for any reason, the tire wall will be caused to bulge outwardly, engaging the rod 31 causing it to move laterally.

This movement obviously will impart motion to the cam 23, against the action of the springs 24, causing contact arm 26 to flex into engagement with the fixed contact 27. The circuit involved is thus completed, causing energization of the buzzer and light associated with the circuit, thus appraising the driver of an improperly inflated tire. After remedy of the defective tire the cam will return to normal position. It is preferred that the actuator rods 31 curve backwardly from the forward line of travel, thus producing a steamline effect and will more readily avoid engagement with foreign objects. Also it should be noted that the rod 31 is readily adjustable vertically, permitting its installation upon cars employing various sized tires.

In Figure 5, the circuit controlling device is illustrated as a breaker, the parts being substantially the same as that shown in Figure 4, with the exception that the spring 26a is moved out of engagement with the spring 27a upon actuation of the cam 23a.

While I have shown and described a preferred construction, this is for the purpose of illustration only, and I consider as my own, all such modifications as fairly fall within the scope of the appended claim.

I claim:—

A tire inflation or deflation switch comprising a casing having a semi-circular contour adapted to fit within the circumference of the rim of a wheel to engage the brake plate of the wheel, said casing having a pair of apertured lugs, the brake plate having a flanged edge, a bolt engaged through the lugs, the bolts having a hooked portion for engaging the flanged edge of the brake drum, a fixed contact within the casing, a leaf spring contact member within the casing of a length overlapping the fixed contact but in spaced relation thereto, a cam member oscillatably journalled within the casing, the cam having a flat face affording seating engagement of the leaf spring, a resilient spring member fixed to opposite sides of the cam to maintain the flat face of the cam in engagement with the leaf spring, said cam having a hub portion exteriorly of the casing, and an actuator rod adjustably mounted within the hub and terminating in proximity of the pneumatic tire of the wheel and adapted to be moved upon a variation of pressure in the tire.

FRED DILTS.